United States Patent [19]

Daniels

[11] Patent Number: 5,656,486
[45] Date of Patent: Aug. 12, 1997

[54] METHOD OF TREATING AND CONDITIONING POULTRY MANURE TO FORM A COMPOSITION FOR BIODEGRADING PETROLEUM COMPOUNDS

[76] Inventor: Thomas Brent Daniels, 241 Bethany Church Rd., Colerain, N.C. 27924

[21] Appl. No.: 661,039

[22] Filed: Jun. 10, 1996

[51] Int. Cl.⁶ .................................................... C12N 1/20
[52] U.S. Cl. ........................ 435/252.4; 435/290.3; 435/290.1; 435/252.1; 435/262; 435/262.5; 435/264; 435/266; 435/281; 71/25
[58] Field of Search ................... 435/243, 290.3, 435/290.1; 426/2; 71/25, 8, 252.1, 252.4, 262, 262.5, 264, 266, 281

[56] References Cited

U.S. PATENT DOCUMENTS 3,939,280  2/1976  Karnemaat ............................ 426/2
5,169,782  12/1992  Murphy et al. ...................... 435/290.3
5,501,718  3/1996  Bandurski ............................... 71/9

*Primary Examiner*—Jean C. Witz
*Attorney, Agent, or Firm*—Rhodes, Coats, & Bennett, LLP

[57] ABSTRACT

The present invention entails a method for treating and conditioning poultry manure to form an organic product that is capable of biologically removing hydrocarbon based molecules from soils and other surfaces. Poultry manure is composted by mixing and agitating the poultry manure contained in a mixing station. During this process, specific and selected microorganisms are added to the poultry manure. These microorganisms are specific in that they have a special affinity for consuming and reducing hydrocarbons. The added microorganisms are caused to multiply and proliferate by continuously agitating and aerating the poultry manure. Finally, a treated and conditioned poultry manure product is formed and thereafter, the formed poultry product is screened and bagged and in select cases can be pelletized.

18 Claims, No Drawings

METHOD OF TREATING AND CONDITIONING POULTRY MANURE TO FORM A COMPOSITION FOR BIODEGRADING PETROLEUM COMPOUNDS

FIELD OF THE INVENTION

The present invention relates to poultry manure and particularly to a process for treating and conditioning poultry manure such that the poultry manure product is capable of decontaminating petroleum compounds on a surface or present in an underlying sub-surface.

BACKGROUND OF THE INVENTION

Poultry manure, that is chicken and turkey manure, has long been used as a natural fertilizer for lawns, flower beds, and a wide variety of agricultural crops. While poultry manure is quite efficient in stimulating and enhancing the growth of plants and crops, poultry manure has the unique advantage of being environmentally sound and does not carry the environmental risk and drawbacks associated with chemical fertilizers.

SUMMARY AND OBJECTS OF THE INVENTION

The present invention focuses on an additional use of poultry manure, a use directed to the bioremediation of surfaces and sub-surfaces that are contaminated with petroleum compounds. Specifically, the present invention is directed towards a treated and conditioned poultry manure product that is capable of biologically degrading hydrocarbon based molecules.

In particular, the present invention entails both a method or process for manufacturing the poultry manure product and the final poultry manure composition. The method of treating and conditioning poultry manure to form a composted organic composition capable of biodegrading hydrocarbons includes placing poultry manure into a mixing station (in-vessel composter) and adding select microorganisms to the poultry manure. The select microorganisms added have a specific affinity for hydrocarbon based molecules. After the select microorganisms have been added to the poultry manure, the poultry manure with the added microorganisms is continuously aerated by agitating (or forcing air through the manure) the poultry manure and added microorganisms so as to cause the added microorganisms to multiply and proliferate.

This produces a poultry manure composition that is capable of biologically degrading petroleum products. The poultry manure composition includes naturally occurring microorganisms and also includes the specific added microorganisms, and microorganisms that have proliferated therefrom, that have a special affinity for hydrocarbon based molecules.

In use, the treated and conditioned poultry manure is applied to a surface or sub-surface that includes petroleum compounds. Over time, the contaminated area is irrigated and periodically tilled. During this time, the microorganisms consume the petroleum compounds and convert the same to fatty acids. In the end, the by-products are carbon which forms an energy base for organisms, carbon dioxide and water.

It is therefore an object of the present invention to provide a poultry manure product that will act on contaminants in the soil through bioremediation.

It is a further object of the present invention to provide this poultry manure product that is totally natural and recyclable.

Still a further object of the present invention is to provide the poultry manure product of the character referred to above in the form of a totally natural organic product that is human, animal and earth friendly.

It is also a primary object of the present invention to charge poultry manure with additional microorganisms in sufficient quantities to be effective in decontaminating surfaces and sub-surfaces that include petroleum compounds.

DETAILED DESCRIPTION OF THE INVENTION

Poultry manure, including both chicken and turkey manure, is collected and stored in a covered facility for the purpose of warehousing the poultry manure. Typically, this poultry manure is collected from poultry houses of poultry operators in and around a certain geographical area.

To mix, treat and condition the poultry manure, there is provided a mixing station or what is sometimes referred to as an in-vessel composter. In any event, the mixing station can include an elongated concrete channel structure that is covered. The poultry manure is hauled or conveyed into the mixing station and deposited, for example, in the elongated concrete channel structure. Typically, the poultry manure would span a width of approximately 20 feet and would be piled to a height of approximately 3 feet. The length of the manure pile could vary. In particular, this process has been carried out where the manure was deposited in a 250 foot concrete channel. It is appreciated that various size treating stations can be constructed and that the poultry manure can assume various widths and heights within the mixing or treating station.

Basically, the present process entails treating and conditioning the poultry manure to render a poultry manure composition that is capable of biologically degrading petroleum compounds. In the course of treating and conditioning the poultry manure, the poultry manure will effectively be composted.

The following is an example of a procedure and process for treating and conditioning the poultry manure to give rise to the product of the present invention. Once the poultry manure has been deposited within the mixing station, the poultry manure will essentially be held in the mixing station for a first period of approximately fourteen (14) days. During the first period, the poultry manure will be moistened, stirred and agitated every two days. This can be accomplished in various ways. However, one particular way of agitating and storing the poultry manure would be with the provision of an overhead flail-type agitator that is designed to move fore and aft along the mixing station and to ride over and through the piled poultry manure. As the agitator is self-propelled through the poultry manure, the agitating blades or flails thereon rotate through the poultry manure, stirring and agitating the same. This stirring and agitating process is conducted approximately every two days and is done in such a fashion that the agitator passes through substantial portions of the piled poultry manure.

It is appreciated that the poultry manure includes naturally occurring microorganisms. This stirring and agitating referred to above essentially aerates the poultry manure and also provides temperature control in the process. The aeration provides oxygen to the naturally occurring microorganisms and effectively causes the naturally occurring microorganisms to grow and proliferate. At the same time, the aeration is important so as to maintain the temperature within the piled poultry manure to a temperature of approximately 120° F. or less. At approximately fourteen days into the first period, it is contemplated that one could add a substance such as alum, dry or liquid.

At approximately nineteen days into the composting process just described, a select strain or group of condensed microorganisms or microbes are added to the poultry manure. The quantity of microbes added can vary. However, it is contemplated in this example that approximately 1 to 1.5 pounds of microbes could be added per 20 cubic yards of poultry manure. It is desirable for the moisture content of the manure to be at a level of twenty-five (25%) percent or less before the microbes are added.

The microbes added are special microbes in that the microbes selected for addition to the poultry manure are collected, grown and propagated and have a special affinity for petroleum compounds and particularly hydrocarbon based molecules. These microorganisms are commercially available and are generated by collection from natural sources. In particular, the added microbes are aerobic inasmuch as they require oxygen and are activated by water. A temperature tolerance range of approximately 35° F. to 120° F. is appropriate for these select microbes. The pH range for the aerobes can range from 5.5 to 8.0. Suitable microbes are commercially available. In the way of an example, such microbes are available through Agri-Microbe Sales, Inc., of Chester, Va.

Once the added microbes have been incorporated into the poultry manure, from this point on in the process, the poultry manure and added microorganisms mixture is continuously agitated and aerated every day during the remaining stages of the process. While the time period for agitation and aeration may vary, it is contemplated that such would be carried out approximately 6 to 12 hours continuously each day.

After the select microbes have been added, it continues to be important to control the temperature within the poultry manure to 120° F. or less. In addition, it is important to maintain the temperature at least 35° F. This temperature range coupled with the agitation and aeration of the poultry manure gives rise to the added microorganisms continuing to multiply and proliferate.

After the select microorganisms have been added to the poultry manure, the moisture content of the poultry manure-microorganism mix is continued to be monitored. The target moisture content is approximately fifteen (15%) percent. That is, once the moisture content of the poultry manure is lowered to approximately fifteen (15%) percent or below, then the process has reached its final stage and the poultry manure is said to be properly treated and conditioned for the purpose of biologically degrading petroleum compounds. Once this point in the process has been reached, the treated and conditioned poultry manure is removed from the vessel composter or the mixing station and is screened and bagged. In appropriate cases, the processor can elect to pelletize the treated and conditioned poultry manure.

The product manufactured or formed by the above process comprises both naturally occurring microorganisms and the added select microorganisms that have now multiplied and proliferated to a considerable level. Now, the treated and conditioned poultry manure is charged with a high level of microorganism concentration and activity wherein the charged microorganism activity is capable of converting hydrocarbons on a surface or within a sub-surface to non-contaminants, particularly carbon, carbon dioxide and water.

In application, the treated and conditioned poultry manure product just described is spread over a contaminated surface. Spreading can be done with a rotary spreader, drop spreader, or agriculture spreader, depending on the job size. Contaminated petroleum compounds can occur on the surface or within an underlying sub-surface. Once the treated and conditioned poultry manure has been spread over the surface of the contaminated area, the poultry manure is tilled as deep as practical into the contaminated area. Once the poultry manure has been tilled into the contaminated area, the area should be irrigated periodically. This provides an appropriate environment for the microorganisms and continues to encourage the multiplication and proliferation of the microorganisms.

In a simplified form, the degradation process for hydrocarbons entails the microorganisms actually consuming the hydrocarbon compounds. Once consumed, the microorganisms convert the hydrocarbon compounds to fatty acids. This produces end products that include carbon, carbon dioxide and water.

In order for the poultry manure composition to be efficient, it is important that the microorganisms be exposed to sufficient oxygen, that is oxygen at a residual level of 1 ppm or more. This oxygen level can be obtained by pumping air through subsurface pipes or tilling soil to increase air space in soil structure. In addition, there must be essential inorganic nutrients present and the microorganisms must be brought into contact with the area, material or surface to be treated. In addition, it is important to maintain the treated area with sufficient water for the purpose of maintaining the microorganisms in an active state.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

I claim:

1. A method of producing a composted poultry manure composition for degrading hydrocarbon compounds consisting essentially of:
   a) placing poultry manure into a mixing station;
   b) composting the poultry manure within the mixing station by mixing and aerating the poultry manure to form a composted poultry manure product;
   c) adding microorganisms to the composted poultry manure product capable of degrading hydrocarbon compounds;
   d) aerating the poultry manure and added microorganisms to cause the added microorganisms to multiply and proliferate to form a composted poultry manure composition that when applied to an area contaminated by hydrocarbon compounds acts to degrade the hydrocarbon compounds.

2. The method of claim 1 wherein the poultry manure is dried as the poultry manure is mixed and aerated in the mixing station.

3. The method of claim 1 wherein the temperature of the poultry manure is maintained at no more than 120° F.

4. The method of claim 1 wherein the pH of the poultry manure being composted is maintained at a range of 5.5 to 10.0.

5. The method of claim 1 wherein the poultry manure is aerated for at least approximately six hours a day after the microorganisms have been added to the composted poultry manure.

6. The method of claim 1 wherein the poultry manure is aerated for at least approximately twelve hours a day after the microorganisms have been added to the composted poultry manure.

7. The method of claim 1 wherein the poultry manure is composted by holding it in the mixing station and mixing and aerating the poultry manure for at least approximately 14 days.

8. The method of claim 7 wherein the composting step further includes adding alum to the composted poultry manure.

9. The method of claim 1 wherein approximately 1 to 1.5 pounds of microorganisms are added per 20 cubic yards of poultry manure.

10. The method of claim 1 wherein the poultry manure is aerated by forcing air through the manure.

11. The method of claim 10 wherein the aeration is provided by a subsurface aeration system which directs air into and through the poultry manure.

12. The method of claim 9 wherein the microorganisms are mixed with warm water and sprayed onto the composted poultry manure.

13. The method of claim 7 wherein the composting step further includes adding water to the poultry manure during the composting process.

14. The method of claim 7 wherein the microorganisms are added approximately 19 days after the poultry manure composting process begins and wherein the moisture content of the composted poultry manure is lowered to at least 25% before adding the microorganisms.

15. A poultry manure composition for degrading hydrocarbon compounds made by a process consisting essentially of:

a) placing poultry manure into a mixing station;

b) composting the poultry manure within the mixing station by mixing and aerating the poultry manure to form a composted poultry manure product;

c) adding microorganisms to the composted poultry manure product capable of degrading hydrocarbon compounds;

d) aerating the poultry manure and added microorganisms to cause the added microorganisms to multiply and proliferate to form a composted poultry manure composition that when applied to an area contaminated by hydrocarbon compounds acts to degrade the hydrocarbon compounds.

16. The poultry manure composition of claim 15 wherein approximately 1 to 1.5 pounds of microorganisms are added per 20 cubic yards of poultry manure.

17. The poultry composition of claim 15 wherein the moisture content of the poultry manure composition is twenty-five (25%) percent or less prior to adding the microorganisms.

18. The poultry manure composition claim 15 wherein the pH of the poultry manure composition is between 5.5 and 10.0.

* * * * *